US008108316B1

(12) United States Patent
Shapiro et al.

(10) Patent No.: US 8,108,316 B1
(45) Date of Patent: Jan. 31, 2012

(54) SYSTEMS, APPARATUS, AND METHODS FOR ONLINE PURCHASING

(75) Inventors: Steven Shapiro, San Jose, CA (US); Paul Agbabian, Los Angeles, CA (US); Robert Curlee, Los Gatos, CA (US); Daniel Grimes, Cary, NC (US); Gil Reuveny, Los Angeles, CA (US); Lyn Tran, West Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 660 days.

(21) Appl. No.: 11/960,728

(22) Filed: Dec. 20, 2007

(51) Int. Cl.
*G06Q 20/00* (2006.01)
(52) U.S. Cl. ............................ 705/64; 705/76
(58) Field of Classification Search ............... 705/64–76
See application file for complete search history.

(56) References Cited

U.S. PATENT DOCUMENTS

| | | | | |
|---|---|---|---|---|
| 4,468,728 | A * | 8/1984 | Wang | 1/1 |
| 4,805,099 | A * | 2/1989 | Huber | 1/1 |
| 5,884,309 | A * | 3/1999 | Vanechanos, Jr. | 1/1 |
| 6,069,941 | A * | 5/2000 | Byrd et al. | 379/121.06 |
| 6,263,341 | B1 * | 7/2001 | Smiley | 707/812 |
| 6,317,028 | B1 * | 11/2001 | Valiulis | 340/10.1 |
| 6,997,379 | B2 * | 2/2006 | Boyce et al. | 235/380 |
| 7,080,070 | B1 * | 7/2006 | Gavarini | 705/26.8 |
| 7,246,086 | B2 * | 7/2007 | Araki et al. | 705/26 |
| 7,574,444 | B2 * | 8/2009 | Welingkar et al. | 1/1 |
| 2001/0053980 | A1 * | 12/2001 | Suliman et al. | 705/1 |
| 2002/0004780 | A1 * | 1/2002 | Mizuta | 705/39 |
| 2002/0111907 | A1 * | 8/2002 | Ling | 705/41 |
| 2002/0120582 | A1 * | 8/2002 | Elston et al. | 705/64 |
| 2002/0161591 | A1 * | 10/2002 | Danneels et al. | 705/1 |
| 2002/0194076 | A1 * | 12/2002 | Williams et al. | 705/26 |

(Continued)

FOREIGN PATENT DOCUMENTS

JP 05173972 * 7/1993

(Continued)

OTHER PUBLICATIONS

"Web Application Terminology." Adobe Corp. All pages Retrieved Aug. 24, 2010. <http://help.adobe.com/en_US/Dreamweaver/10. 0_Using/WSEDF6B000-F0D9-4565-9023-85171DCB4E47. html>.*

(Continued)

*Primary Examiner* — Andrew J. Fischer
*Assistant Examiner* — Calvin K Cheung
(74) *Attorney, Agent, or Firm* — Advantedge Law Group

(57) ABSTRACT

The disclosure is directed to systems, apparatus, and methods for online purchasing. In one example, a system includes a web server that presents purchase options and receives user input. The system may also include an application server that attempts to authenticate users to existing accounts using an account identifier, such as a user ID or email address. If a user does not provide an identifier corresponding to an existing account, the application server may create a new account. If the user provides an identifier corresponding to an existing account, but does not provide a valid password, the application server may create a provisional account. The application server may also associate purchases with the user's account and provide access to the purchased product. Purchases associated with a provisional account may be resolved with an existing or newly-created permanent account when additional user information is received, such when the product is registered.

20 Claims, 5 Drawing Sheets

U.S. PATENT DOCUMENTS

| | | | |
|---|---|---|---|
| 2002/0198804 A1* | 12/2002 | Calvin | 705/35 |
| 2003/0192250 A1* | 10/2003 | Weder et al. | 47/72 |
| 2003/0208624 A1* | 11/2003 | Grossman | 709/245 |
| 2004/0044596 A1* | 3/2004 | Franks | 705/28 |
| 2004/0123160 A1* | 6/2004 | Mizrah | 713/202 |
| 2005/0116028 A1* | 6/2005 | Cohen et al. | 235/380 |
| 2005/0138216 A1* | 6/2005 | Giles | 710/1 |
| 2005/0140675 A1* | 6/2005 | Billingsley et al. | 345/440 |
| 2005/0192008 A1* | 9/2005 | Desai et al. | 455/435.2 |
| 2005/0192863 A1* | 9/2005 | Mohan | 705/14 |
| 2006/0041756 A1* | 2/2006 | Ashok et al. | 713/183 |
| 2006/0089849 A1* | 4/2006 | Irby et al. | 705/1 |
| 2007/0157032 A1* | 7/2007 | Paganetti et al. | 713/193 |
| 2007/0255575 A1* | 11/2007 | Buchheit | 705/1 |
| 2007/0255943 A1* | 11/2007 | Kern et al. | 713/155 |
| 2010/0275250 A1* | 10/2010 | Devadoss et al. | 726/6 |

FOREIGN PATENT DOCUMENTS

| | | | |
|---|---|---|---|
| JP | 2000286831 | * | 10/2000 |
| KR | 2006017724 A | * | 2/2006 |

OTHER PUBLICATIONS

Gustafson, D., "RFC 3760", Apr. 2004, Internet Engineering Task Force (IETF), all pages, <http://tools.ietf.org/pdf/rfc3760.pdf>.*

Japanese machine translation of JP2000-286831 (Item N) in English.*

Japanese machine translation of JP05173972 (Item O) in English.*

* cited by examiner

SYSTEMS, APPARATUS, AND METHODS FOR ONLINE PURCHASING

BACKGROUND INFORMATION

Online purchasing methods follow a typical pattern for many types of products or services. New customers typically create a user account with a user ID and password and provide information such as a mailing address, email address, and a credit card number or other form of payment. When the customer returns make subsequent purchases, perhaps months later, the customer may not remember their user ID or password. In the case of subscription products, a purchaser may not return to the sales web site to renew a subscription for a year. If the customer represents a corporation, the user account may be shared among multiple purchasers, increasing the chances that the customer credentials may have been forgotten or changed. Unfortunately for the e-commerce vendor, each step in the purchase process may result in lost customers due to forgotten credentials or user abandonment.

BRIEF DESCRIPTION OF THE DRAWINGS

Various embodiments are described with reference to the accompanying drawings, wherein like reference numbers designate like elements, and in which.

DETAILED DESCRIPTION

Figure 1:
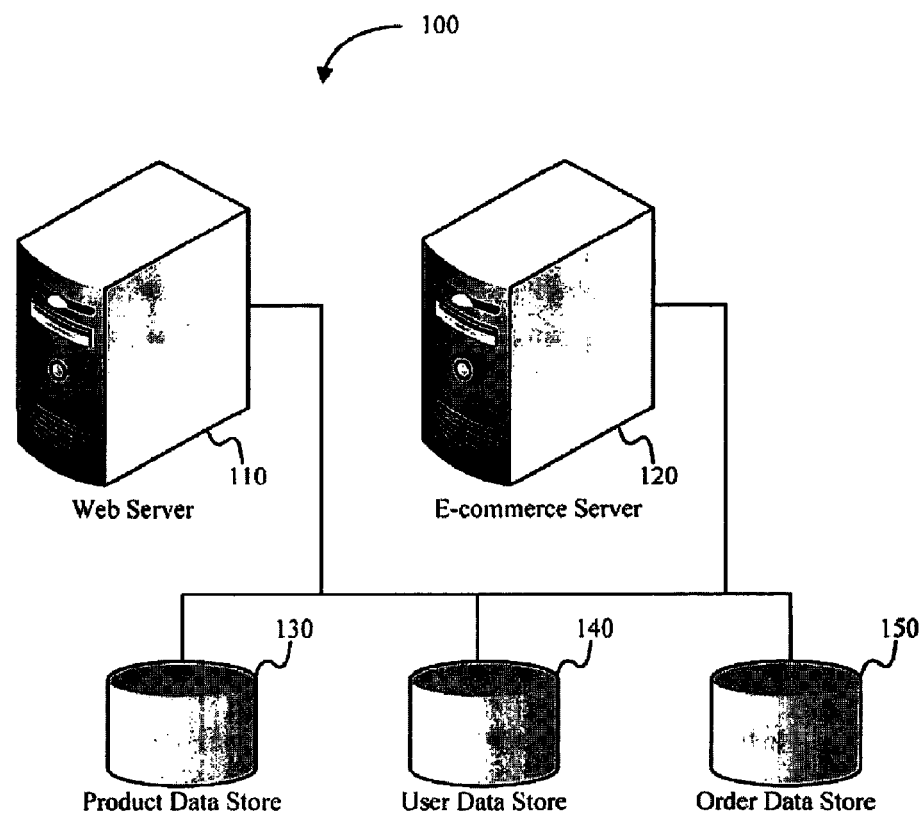
FIG. 1 illustrates one embodiment of computing system configured for online purchasing.

The disclosure is directed to systems, apparatus, and methods for online purchasing.

It should be appreciated that the examples disclosed herein can be implemented in numerous ways, including as one or more processes, apparatuses, systems, devices, methods, computer readable media, or computer program products embodied on computer readable media.

In one example, a system is presented for online purchasing. The system may include a web server that provides web pages that present purchase options and receive input from a user. The system may also include an application server that attempts to authenticate the user to an existing account using an account identifier provided by the user, such as a user ID or email address. If the user does not provide an identifier corresponding to an existing account, the application server may create a new account. If the user provides an identifier corresponding to an existing account, but does not provide a valid password, the application server may create a provisional account. The application server also may also associate purchases with the user's account and provide access to a purchased product. Purchases associated with a provisional account may be resolved with an existing or newly-created permanent account when additional user information is received, such as, for example, at the time when the product is registered. The system may further include, for example, one or more data stores for user data, order data, and product data.

Embodiments described herein will be best understood by reference to the drawings. It will be readily understood that the components generally described and illustrated in the drawings herein, could be arranged and designed in a variety of different configurations. Thus, the following detailed description, as represented in the drawings, is not intended to limit the scope of the disclosure but is merely representative of certain embodiments.

Exemplary systems, apparatus, and methods for online purchasing are described herein. As used herein, the term "computer program" may refer broadly to any set of computer readable instructions embodied on one or more computer readable media, the instructions being executable by one or more computing devices. Computer programs may include, but are not limited to, applications, subroutines, and operating systems.

Online purchasing systems, apparatus, and methods disclosed herein can increase the completion rate for online sales. For example, a user may complete an online purchase of a product or service without being required to enter information to create a user account or authenticate to an existing account.

Turning now to the drawings, FIG. 1 illustrates one embodiment of a computing system 100 (or simply "the system 100") configured for online purchasing. As shown, the computing system 100 includes a web server 110, an e-commerce server 120, a product data store 130, a user data store 140, and an order data store 150. The system 100 increases the completion rate of online sales by enabling the user to complete the purchase process without being required to enter data to create a new user account or authenticate to an existing account.

In certain embodiments, the online purchasing system 100 may include any computer hardware and/or instructions (e.g., software programs), or combinations of software and hardware, configured to perform the processes described herein. In particular, it should be understood that system 100 may include any of a number of well known computing devices, and may employ any of a number of well known computer operating systems, including, but by no means limited to, known versions and/or varieties of Microsoft Windows®, UNIX, Macintosh®, and Linux® operating system software.

Accordingly, the processes described herein may be implemented at least in part as instructions (e.g., one or more computer program products) embodied on one or more computer readable media and executable by one or more computing devices. In general, a processor (e.g., a microprocessor) receives instructions, e.g., from a memory, a computer readable medium, etc., and executes those instructions, thereby performing one or more processes, including one or more of the processes described herein. Such instructions may be stored and transmitted using a variety of known computer readable media.

A computer readable medium (also referred to as a processor readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR")

data communications. Common forms of computer readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

While one embodiment of a computing system 100 is shown in FIG. 1, the components illustrated in FIG. 1 are not intended to be limiting. Indeed, additional or alternative components, implementations, or computing systems may be used to implement the principles and processes described herein.

As depicted in FIG. 1, the web server 110 provides interface components that enable users to identify themselves, make purchase selections, and provide payment information. The web server 110 receives input from users to be communicated to the e-commerce server 120. In one embodiment, the web server 110 performs user identification and/or authentication functions. The web server 110 may be variously embodied using any of a number of common web servers, such as Apache Web Server, Microsoft IIS Web Server, Google Web Server. Sun-ONE-Web-Server, or the like. The web server 110 may employ any combination of the many languages and tools for developing web interfaces, such as HTML, XML, Perl, VBScript, Python, PHP, or the like.

The e-commerce server 120 receives user input from the web server 110 to perform such operations as identifying users, creating new accounts or provisional accounts as needed, making or recording financial transactions, and fulfilling product orders. In performing these operations, the e-commerce server 120 may query the product data store 130, user data store 140, or order data store 150 for required data and create or modify entries in the data stores 130, 140, and 150. In one embodiment, the e-commerce server 120 is implemented as one or more programs or processes running on the web server 110.

The product data store 130 stores data related to products or services available for purchase. The product data store 130 may include, for example, subscription products. The web server 110 may access the product data store 130 to obtain data to be provided to users. The user data store 140 stores user account information such as company name, address, telephone number, contact name, credit card information, or the like. The order data store 150 stores information related to product orders. In one embodiment, the order data store 150 stores an order history of software products provided electronically to users. In another embodiment, the order data store 150 stores a history of products ordered and product orders yet to be fulfilled. In one embodiment, the data stores 130, 140, and 150 are tables in one or more relational databases.

Figure 2:
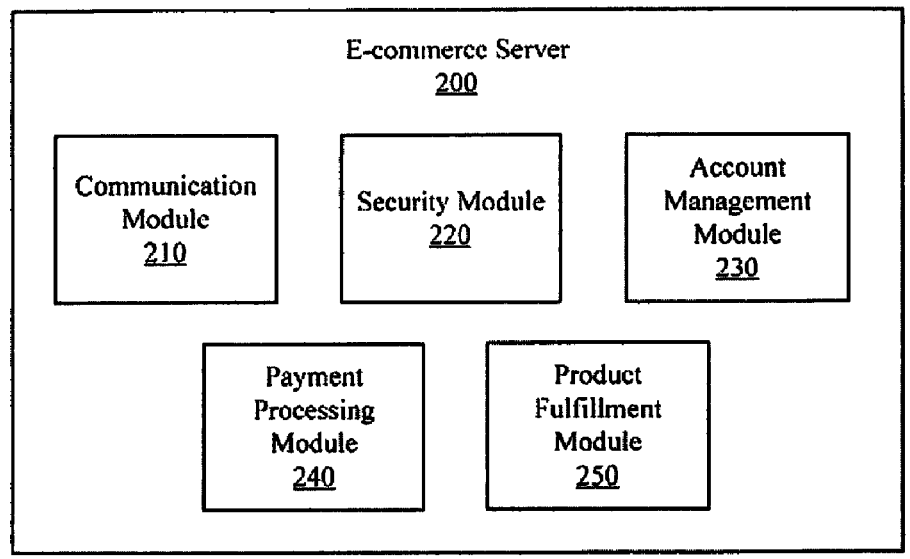
FIG. 2 illustrates components of one embodiment of an e-commerce server.

FIG. 2 illustrates one embodiment of components of an e-commerce server 200 in accordance with certain embodiments. As shown, the e-commerce server 200 may include a communication module 210, a security module 220, an account management module 230, a payment processing module 240, and a product fulfillment module 250. The e-commerce server 200 facilitates online fulfillment of purchases. The e-commerce server 200 is one embodiment of the e-commerce server 120 shown in FIG. 1.

The communication module 210 receives user input received by the web server 110 to perform such operations as identifying users, creating new accounts or provisional accounts as needed, making or recording financial transactions, and fulfilling product orders. The communication module 210 may communicate data received by the web server 110 to other modules of the e-commerce server 200. For example, user credentials may be passed to the security module 220 for authentication, user information may be passed to the account management module 230 to create a new account or update an existing account, a credit card number and charge amount may be passed to the payment processing module 240 to charge a user's credit card, or order information may be passed to the product fulfillment module 250 so that a purchased product or service may be provided to the user. In certain embodiments, the communication module 210 may provide interfaces to external databases, such as the product data store 130, user data store 140, and order data store 150, for other modules of the e-commerce server 200.

The security module 220 may identify users based on user identification data received from the communication module 210. En certain embodiments, the security module 220 may use a user ID and password to match a user identity to an existing user account. The security module 220 may use other identifiers, such as an email address, company name, or the like. Depending upon the level of security desired, the security module 220 may compare the identifier and password to identifiers and passwords stored in clear text or an encrypted form in the user data store 140, or the security module 220 may authenticate the user using any of the authentication protocols familiar to one skilled in the art.

If the identifier does not match an existing account, the security module 220 may provide the identifier to the account management module 230 to create a new account. If the identifier matches an existing account, but the password does not match the password associated with the account, the security module 220 may provide the identifier and password to the account management module 230 to create a provisional account. In other embodiments, whether to provide a password is optional to the user. If the user identification data received from the user does not match an existing account, the security module 220 may provide the identification data to the account module 230 to create a new account and the security module 220 may generate a password for the account. In certain embodiments, the password may then be sent to the user via email. If the user provides a user identifier that matches an existing account, but no password, the security module 220 may proceed as if an incorrect password were provided.

The account management module 230 may maintain user account data in the user data store 140 and receive and provide user account information to the other modules of the e-commerce server 200. In certain embodiments, the account management module 230 may receive account information for new user accounts from the communication module 210. New user account information may be entered by the user or imported from an external database to the user data store 140. In certain embodiments, requests from the account management module 230 to store and retrieve user account data in the user data store 140 may be made via the communication module 210.

The payment processing module 240 may process payments for purchases made by the user. The payment processing module 240 may record purchase information in the order data store 150. In certain embodiments, requests to retrieve and store data in the order data store 150 are made via the communication module 210. In certain embodiments, the payment processing module 240 receives payment information entered by the user, via the communication module 210. Alternatively or additionally, the payment processing module 240 may receive credit card information entered by the user, request the account management module 230 to retrieve credit card information from the user data store 140, initiate an electronic funds transfer, or generate an invoice to be sent to the user.

As illustrated, the product fulfillment module 250 may initiate the process of delivering the purchased product to the user. In certain embodiments, the product fulfillment module 250 may provide the product directly to the user for download via the internet. Communication with the user may be conducted via the communication module 210. In certain embodiments, the product fulfillment module 250 makes an entry in the order data store 150 indicating that the user's subscription has been extended, and that a product or service delivered periodically (via email or other electronic transfer, postal delivery, via in-person visit by service personnel, or the like) should continue to be delivered until a specified date.

Figure 3:
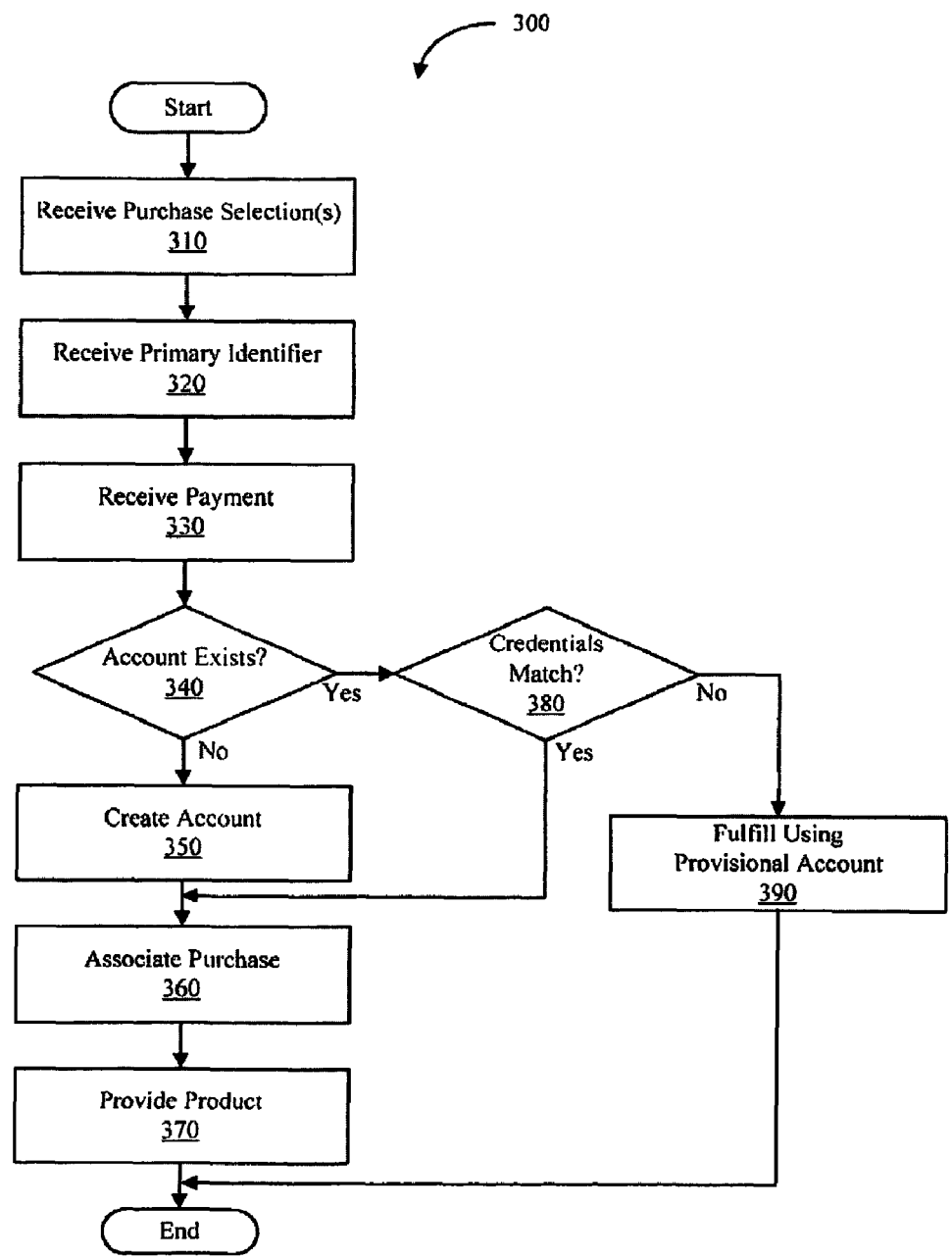
FIG. 3 illustrates components of one embodiment of a purchase fulfillment method.
Figure 4:
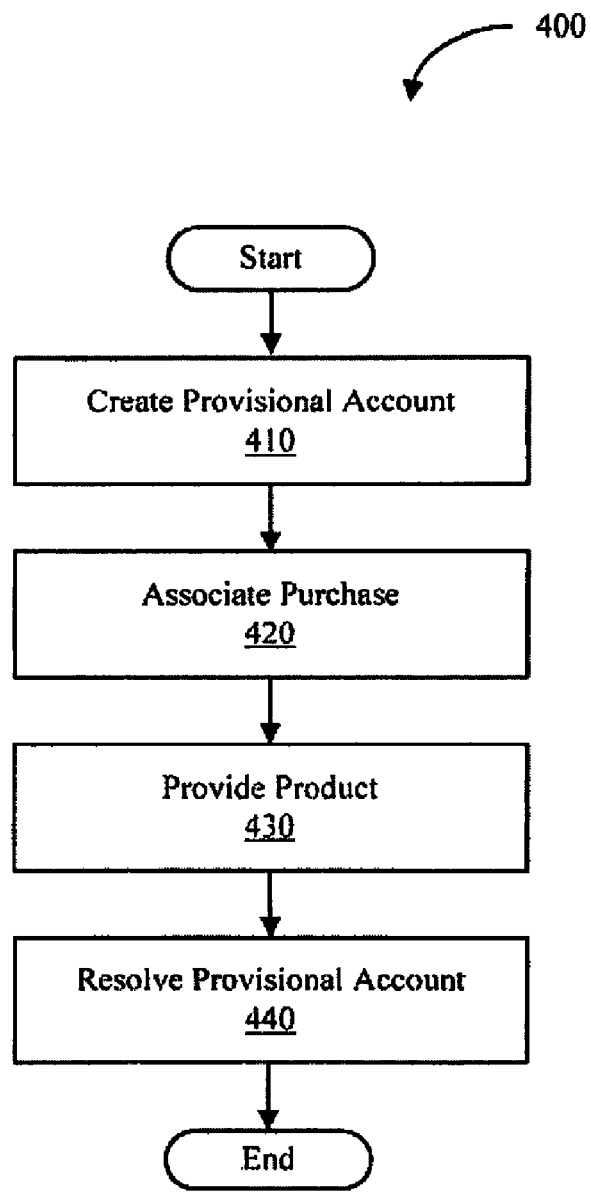
FIG. 4 illustrates components of one embodiment of a provisional account fulfillment method.
Figure 5:
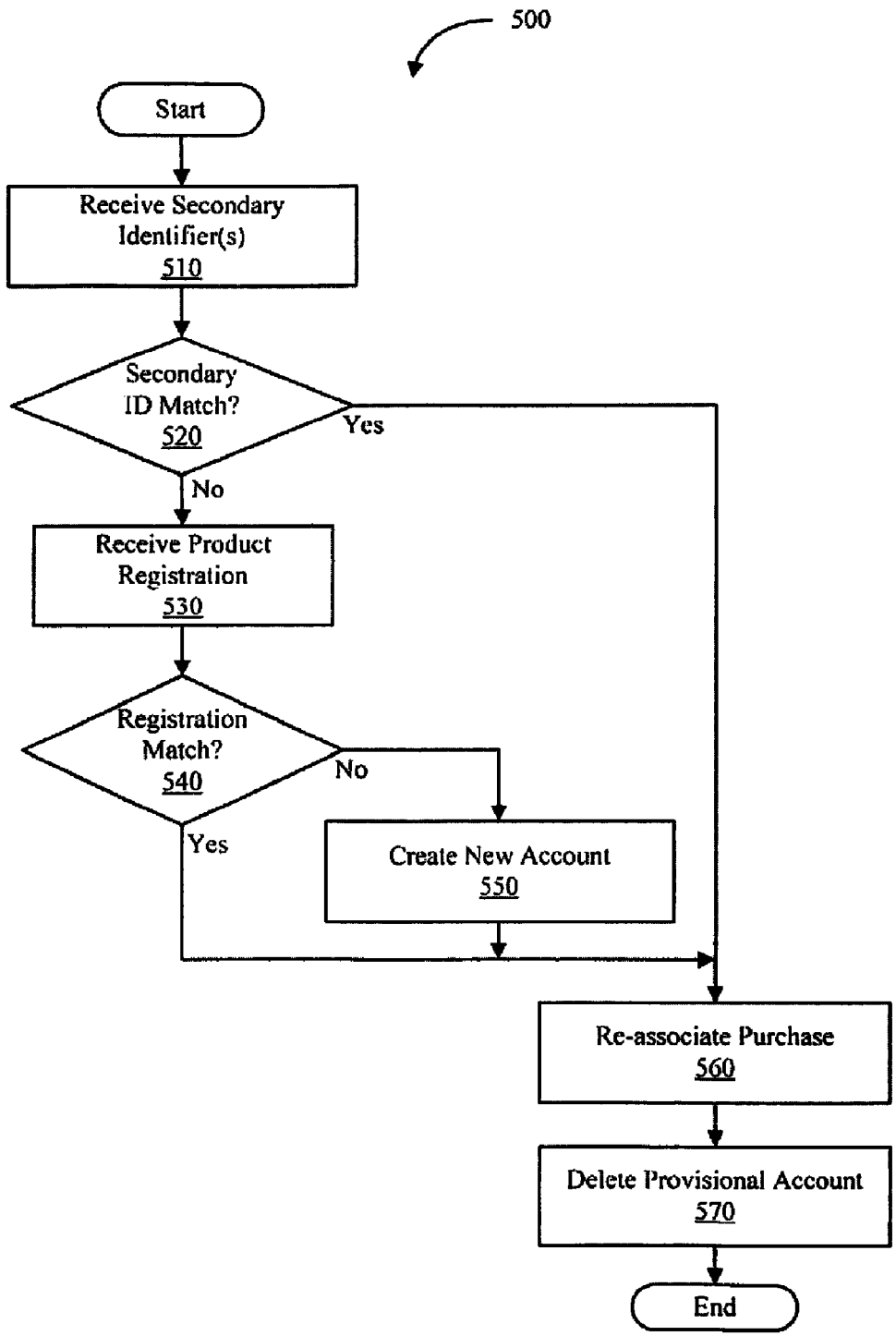
FIG. 5 illustrates components of one embodiment of a provisional account resolution method.

While FIGS. 3-5 illustrate acts according to certain embodiments, other embodiments may omit, add to, reorder, and/or modify any of the acts shown in FIGS. 3-5. FIG. 3 illustrates one embodiment of an online sale method 300. As depicted, the online sale method 300 includes a receive purchase selection(s) operation 310, a receive primary identifier operation 320, a receive payment 330 operation, and an account exists test 340. The online sale method 300 may also include a create account operation 350, an associate purchase operation 360, a provide product operation 370, a credentials match test 380, and a fulfill using provisional account operation 390. The online sale method 300 facilitates online purchasing.

The receive purchase selection(s) operation 310 receives one or more purchase selections from the user. In certain embodiments, the user does not provide identification information prior to or during the receive purchase selection(s) operation 310. The receive primary identifier operation 320 may receive a primary identifier from the user. The primary identifier may be a user ID, email address, company name, or the like. In one embodiment, the primary identifier may be an encrypted token received from client software employed by the user. In certain embodiments, whether to include a password with the primary identifier is optional to the user. The receive payment 330 operation may receive payment information corresponding to the purchase selection(s) received in the receive purchase selection(s) operation 310. Payment information may include, for example, information required to charge a credit card, conduct an electronic funds transfer, send an invoice, or the like.

As shown, the account exists test 340 determines whether the primary identifier provided by the user matches an existing account in the user data store 140. If a matching account exists, the online sale method 300 may continue with the credentials match test 380, otherwise the online sale method 300 may continue with the create account operation 350.

The create account operation 350 creates a new user account in the user data store 140 using the primary identifier received from the user. In one embodiment, the create account operation 350 displays a form or a series of interface controls to obtain account information from the user, such as an email address, company name, telephone number, mailing address, or the like. In another embodiment, the create account operation 350 creates a new user account using user information obtained by the receive primary identifier operation 320 and receive payment operation 330. Additional user information may be obtained and added to the user account record by the provide product operation 370 or when a product is registered.

The associate purchase operation 360 associates the purchase selection(s) with the user account. In certain embodiments, the associate purchase operation 360 creates an order record in the order data store 150 and associates the order record with the purchaser's user account record in the user data store 140. The associate purchase operation 360 may record a product serial number associated with the product to be provided in the order record in the order data store 150. The product serial number may be used when the product is registered to facilitate identifying the user associated with the product being registered.

The provide product operation 370 provides the purchased product(s) to the user. In one embodiment, the provide product operation 370 enables the user to download the selected product(s) via the internet. In another embodiment, the provide product operation 370 flags the order record for the selected product(s) in the order data store 150 to be physically shipped to the user. In certain embodiments, the provide product operation 370 extends the expiration date for a product or service in a record in the order data store 150.

The credentials match test 380 determines whether the password or other credentials provided by the user matches the credentials associated with the account associated with the primary identifier. In one embodiment, the credentials match test 380 receives the answer to a security question from the user to verify the user's identity. If the credentials match, the online sale method 300 continues with the associate purchase operation 360. If credentials do not match or are not provided, the online sale method 300 continues with the fulfill using provisional account operation 390. The fulfill using provisional account operation 390 provides the purchase selection(s) received by the purchase selection(s) operation 310 using a provisional account. The record of the purchase in the order data store 150 is resolved with a permanent account record when additional user information is obtained, such as at product registration.

FIG. 4 illustrates one embodiment of a provisional account fulfillment method 400. The provisional account fulfillment method 400 is one embodiment of the fulfill using provisional account operation 390. As depicted, the provisional account fulfillment method 400 includes a create provisional account operation 410, an associate purchase operation 420, a provide product operation 430, and a resolve provisional account operation 440. The provisional account fulfillment method 400 facilitates fulfilling purchases using a provisional account. Using a provisional account to fulfill purchases facilitates completion of the fulfillment process without requiring the user to enter detailed identification information or undergo a rigorous authentication process, resulting in a higher rate of completed sales.

The create provisional account operation 410 creates a provisional account in the user data store 140 using the primary identifier received by the receive primary identifier operation 320. In certain embodiments, the create provisional account operation 410 stores in the provisional account record any user information obtained by the receive primary identifier operation 320 and receive payment operation 330. This information may be used at a later time to match the provisional account to an existing user account, or to populate fields of a new permanent account record, to save the user from having to re-enter the information.

The associate purchase operation 420 associates the purchase with the provisional account. In one embodiment, the associate purchase operation is functionally identical to the associate purchase operation 370. The provide product operation 430 provides the purchased product(s) to the user. In certain embodiments, the provide product operation 430 is functionally identical to the provide product operation 380.

The resolve provisional account operation 440 attempts to match the provisional account to an existing user account using user information received during product registration, subsequent purchases, or the like. If the provisional account matches an existing account, purchase data associated with the provisional account is re-associated with the existing account. If the provisional account does not match an existing account, the provisional account may be converted to a permanent account. In one embodiment, a new permanent account is created. In another embodiment, the provisional account is left in a provisional state. The provisional account resolution method 500 is one embodiment of the resolve provisional account operation 440.

FIG. 5 illustrates one embodiment of a provisional account resolution method 500. In the depicted embodiment, the provisional account resolution method 500 includes a receive secondary identifier(s) operation 510, a secondary ID match test 520, a receive product registration operation 530, and a registration match test 540. The provisional account resolution method 500 further includes a create new account operation 550, a re-associate purchase operation 560, and a delete provisional account operation 570. The provisional account resolution method 500 facilitates either identifying a provisional user account with an existing user account or creating a new user account. Delaying resolution of the provisional account until a purchase is completed streamlines the purchase process, making it less likely to be abandoned by the user before completion.

The receive secondary identifier(s) operation 510 receives information that may be used to match the provisional account with an existing account. Possible secondary identifiers include a credit card number, name, address, or the like. One or more secondary identifiers may be obtained by the receive payment operation 330. The secondary ID match test 520 determines whether one or more secondary identifiers match secondary identifiers associated with an existing user account. If matching identifiers are found, the provisional account resolution method 500 continues with the re-associate purchase operation 560, otherwise the provisional account resolution method 500 continues with the receive product registration operation 530.

The receive product registration operation 530 receives product registration information from the user. Product registration information may include a product serial number, a primary identifier such as a user ID or email address, a password, a name, a company name, an address, or the like. The registration match test 540 attempts to match product registration information with an existing user account. In one embodiment, if the registration information matches an existing user account, the provisional account resolution method 500 continues with the re-associate purchase operation 560, otherwise the provisional account resolution method 500 continues with the create new account operation 550. In another embodiment, if the registration does not match an existing user account, the account resolution method 500 leaves the provisional account in a provisional state and the account resolution method 500 ends.

The create new account operation 550 creates a new permanent account for the user identified by the provisional account. In one embodiment, the create new account operation 550 modifies a field in the user account record to identify the account as a permanent account rather than a provisional account. The create new account operation 550 may also store user information obtained by the receive secondary identifier(s) operation 510 and the receive product registration operation 530 in the user account record.

The re-associate purchase operation 560 re-associates one or more purchases associated with the provisional account with the new or existing user account. In certain embodiments, the re-associate purchase operation 560 changes a field in an order record in the order data store 150 to associate the order record with the new or existing user account, rather than the provisional account. In one embodiment, the create new account operation 550 converts the provisional account to a permanent account, so order records are already associated with the new permanent account and no change to order records is required.

The delete provisional account operation 570 deletes the provisional account, if it still exists. If the create new account operation 550 converted the provisional account to a permanent account, the provisional account no longer exists.

The preceding description has been presented only to illustrate and describe exemplary embodiments and implementations with reference to the accompanying drawings. It will, however, be evident that various modifications and changes may be made thereto, and additional implementations may be implemented, without departing from the scope of the invention as set forth in the claims that follow. The above description and accompanying drawings are accordingly to be regarded in an illustrative rather than a restrictive sense.

What is claimed is:

1. A system comprising:
a web server comprising at least one processor programmed to:
receive at least one purchase selection from a user;
receive a primary identifier from the user; and
receive payment information for the purchase selection;
an application server comprising at least one processor programmed to:
attempt to authenticate the user to an existing account using the primary identifier by:
determining that the primary identifier corresponds to the existing account;
determining that the user failed to provide a valid password for the existing account;
in response to the determination that the user failed to provide a valid password for the existing account, use the primary identifier to automatically create a temporary provisional account for the user that is distinct from the existing account without requiring any additional information from the user; and
associate the purchase selection with the provisional account in order to fulfill the purchase selection;
a user data store that stores user account data;
an order data store that stores purchase data associated with accounts in the user data store; and
a product data store that stores product description and pricing data.

2. The system of claim 1, wherein the application server is further programmed to provide access to a purchased product corresponding to the purchase selection.

3. The system of claim 1, wherein the application server is further programmed to resolve the provisional account with a permanent account.

4. A computer-implemented method comprising:
receiving at least one purchase selection from a user;
receiving a primary identifier from the user;
receiving payment information for the purchase selection;
attempting to authenticate the user to an existing account using the primary identifier by:
determining that the primary identifier matches the existing account;
determining that the user failed to provide a valid password for the existing account;
in response to the determination that the user failed to provide a valid password for the existing account, using the primary identifier to automatically create a temporary provisional account for the user that is distinct from the existing account without requiring any additional information from the user; and associating the purchase selection with the provisional account in order to fulfill the purchase selection;

wherein all the method steps are performed by a computing device comprising at least one processor.

5. The method of claim 4, wherein the primary identifier comprises at least one of an email address, a user ID, a company name, and an encrypted token.

6. The method of claim 4, further comprising providing access to a purchased product corresponding to the purchase selection.

7. The method of claim 4, further comprising resolving the provisional account with a permanent account.

8. The method of claim 7, wherein resolving the provisional account with the permanent account comprises creating a new permanent account for the user.

9. The method of claim 7, wherein resolving the provisional account with the permanent account comprises:

receiving at least one secondary identifier from the user;

comparing the at least one secondary identifier received from the user with identifiers in the permanent account; and determining that the at least one secondary identifier received from the user matches at least one of the identifiers in the permanent account.

10. The method of claim 9, wherein the secondary identifier comprises at least one of a name, an address, and a credit card number.

11. The method of claim 7, wherein resolving the provisional account with the permanent account comprises:

receiving product registration information from the user; and comparing the product registration information received from the user with information in the permanent account;

determining that at least a portion of the product registration information received from the user matches at least a portion of the information in the permanent account.

12. The method of claim 11, wherein the product registration information comprises authentication credentials and a unique product identifier.

13. An apparatus comprising:

a communication module programmed to:
receive at least one purchase selection from a user;
receive a primary identifier from the user; and
receive payment information for the purchase selection;

a security module programmed to attempt to authenticate the user to an existing account using the primary identifier by:
determining that the primary identifier matches the existing account; and
determining that the user failed to provide a valid password for the existing account;

an account management module programmed to, in response to the determination that the user failed to provide a valid password for the existing account, use the primary identifier to automatically create a temporary provisional account for the user that is distinct from the existing account without requiring any additional information from the user;

a payment processing module programmed to associate the at least one purchase selection with the provisional account in order to fulfill the purchase selection; and at least one processor programmed to execute the communication module, the security module, the account management module, and the payment processing module.

14. The apparatus of claim 13, further comprising a product fulfillment module programmed to provide a purchased product corresponding to the purchase selection.

15. The apparatus of claim 13, wherein the primary identifier comprises at least one of an email address, a user ID, and a company name.

16. The apparatus of claim 13, wherein the account management module is further programmed to resolve the provisional account with a permanent account.

17. The apparatus of claim 16, wherein the account management module resolves the provisional account with the permanent account by creating a new permanent account for the user.

18. The apparatus of claim 16, wherein the account management module resolves the provisional account with the permanent account by:

receiving at least one secondary identifier from the user;

comparing the at least one secondary identifier received from the user with identifiers in the permanent account; and determining that the at least one secondary identifier received from the user matches at least one of the identifiers in the permanent account.

19. The apparatus of claim 18, wherein the secondary identifier comprises at least one of a name, an address, and a credit card number.

20. The apparatus of claim 16, wherein the account management module resolves the provisional account with the permanent account by:

receiving product registration information from the user;

comparing the product registration information received from the user with information in the permanent account; and determining that at least a portion of the product registration information received from the user matches at least a portion of the information in the permanent account.

* * * * *